United States Patent [19]

Sato

[11] Patent Number: 5,751,705

[45] Date of Patent: May 12, 1998

[54] CODE DIVISION MULTIPLE ACCESS BASE STATION TRANSMITTER

[75] Inventor: Toshifumi Sato, Tokyo, Japan

[73] Assignee: NEC Corporation, Tokyo, Japan

[21] Appl. No.: 672,599

[22] Filed: Jun. 28, 1996

[30] Foreign Application Priority Data

Jun. 30, 1995 [JP] Japan ................... 7-188501

[51] Int. Cl.$^6$ .................................................. H04J 13/00
[52] U.S. Cl. .................. 370/335; 370/342; 370/441; 375/200; 375/297; 327/180; 327/309
[58] Field of Search ................................. 370/320, 335, 370/342, 441, 479, 532, 537, 538, 539, 540, 541, 202, 339, 203, 252; 375/200, 201, 203, 205, 286, 287, 296, 297, 298, 313, 295, 299; 455/93, 103, 117; 327/180, 306, 308, 310, 311, 312, 318, 321, 331, 333, 309, 320

[56] References Cited

U.S. PATENT DOCUMENTS

| 4,458,322 | 7/1984 | Veale ........................... 327/306 |
| 4,875,044 | 10/1989 | Ohta et al. ..................... 341/87 |
| 5,038,341 | 8/1991 | Berman et al. ................. 370/320 |
| 5,260,967 | 11/1993 | Schilling et al. ............... 375/205 |
| 5,298,798 | 3/1994 | Furumiya ....................... 327/306 |
| 5,311,555 | 5/1994 | Ichiyoshi ....................... 327/309 |

Primary Examiner—Wellington Chin
Assistant Examiner—Huy D. Vu
Attorney, Agent, or Firm—Ostrolenk, Faber, Gerb & Soffen, LLP

[57] ABSTRACT

A digital base band section includes spread units for directly spreading input transmission data every channel by different spread codes to output spread signals, a summer for summing up the spread signals to output a multiplexed spread signal, a limiter for limiting an amplitude of the multiplexed spread signal not to exceed a predetermined value, and a roll-off filter limits a transmission spectrum by shaping a waveform of the transmission signal to output a digital base band signal to an analog base band/RF section, where it is converted into an analog base band signal by a digital-to-analog converter and a carrier is modulated to convert the analog base band signal into an RF signal in a modulator, which RF signal is amplified in a transmission power amplifier to transmit the amplified RF signal through a transmission antenna.

3 Claims, 7 Drawing Sheets

CODE DIVISION MULTIPLE ACCESS BASE STATION TRANSMITTER

BACKGROUND OF THE INVENTION

The present invention generally relates to a code division multiple access (CDMA) base station transmitter, and particularly, to a CDMA base station transmitter installed in a base station of a mobile communication system of a CDMA type, such as a vehicle telephone system or a portable telephone system or cellular system, permitting an ensured suppression of transmission peak power.

DESCRIPTION OF THE RELATED ART

There are known communication systems employed in a digital vehicle telephone system or a portable telephone system or cellular system, such as a Japanese standard system (PDC:RCR STD 27B), a North American standard system (TIA IS54) and a European standard system (ETSI GSM) using a time division multiple access (TDMA) system, and a new North American standard system (TIA IS95) using a CDMA system.

In the Japanese standard system (PDC) as well as in the North American standard system (IS54) and the European standard system (GSM), there is achieved a multiple access necessary for a cellular system, by combining a TDMA system of a relatively low multiplicity between a triplication to an 8-tuple and a frequency division multiple access (FDMA) system.

In those communication systems, carriers are each modulated by a π/4 shift QPSK (quadriphase shift keying) system or a GMSK (Gaussian filtered minimum phase shift keying) system so that the amplitude is constant or of small variation. It therefore is possible to independently amplify each carrier by a class "AB" or "C" power amplifier with a desirable efficiency.

In this case, however, a dedicated radio section is necessary for each carrier. Accordingly, for a common use of a single antenna, the carriers are multiplexed after the power amplification, using a combiner to minimize a power loss, which is subjected to restrictions such that the carriers cannot be multiplexed if they are not sufficiently distant from each other, and that a frequency change cannot be readily carried out.

On the other hand, if the carriers are hybrid-multiplexed before their collective amplification by a common transmit amplifier, there is needed a class "A" amplifier very high of linearity, free from the restrictions imposed on the case in which a combiner is used. It however is necessary for the transmit amplifier to have a linearity secured over a wide range. If it is failed due to an amplification clip or the like, resultant spectral distortions give disturbances on neighboring channels.

Figure 1:
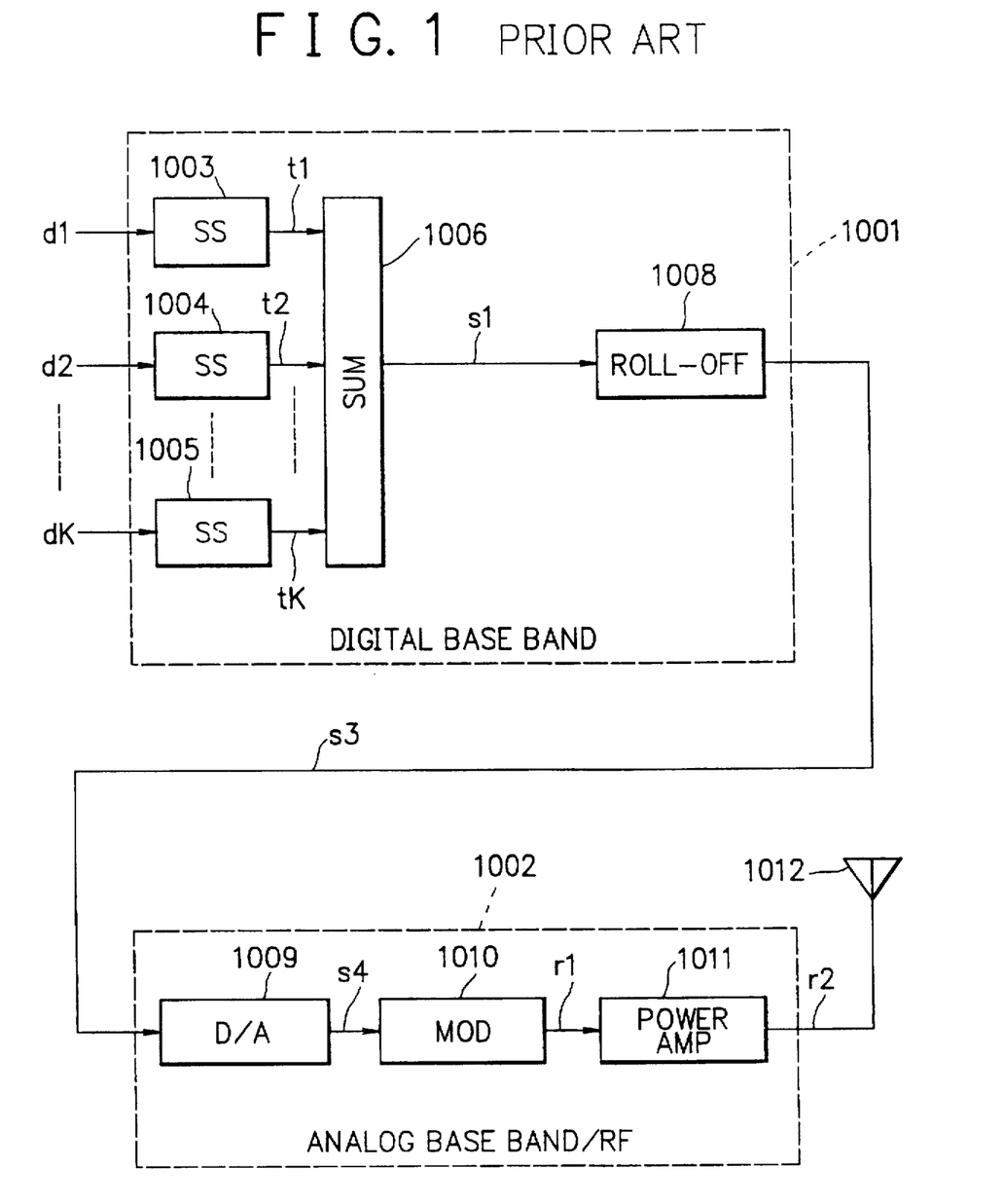
FIG. 1 is a block diagram of a conventional CDMA base station transmitter.

The new North American standard system (IS95) employs the CDMA. FIG. 1 shows a conventional CDMA base station transmitter, which comprises a digital base band processing section 1001, an analog base band/RP section 1002 and a transmission antenna 1012.

The digital base band processing section 1001 includes a total of K spectrum spread units 1003, 1004, . . . , 1005, where K is a positive integer, a summer 1006 and a roll-off filter 1008. A total of K transmission data for a total of K channels, i.e. channel-1 transmission data d1 to channel-k transmission data dK, are input to the K spread units 1003, 1004, . . . , 1005, where they are spectrally spread by a total of K different codes one-to-one assigned to the K channels so that the channel-1 transmission data d1 to channel-k transmission data dK are converted into channel-1 spread data t1 to channel-k spread data tK, respectively.

The summer 1006 sums up the total of K spread data t1 to tK to provide a multiplexed spread signal s1.

The roll-off filter 1008, of which a roll-off characteristic is preset to have an occupied band width equivalent to a predetermined value, performs a spectrum shaping of the multiplexed spread signal s1 to provide a digital base band signal s3, which is output to the analog base band/RF section 1002.

The analog base band/RF section 1002 includes a digital-to-analog (D/A) converter 1009, a modulator 1010 and a transmission power amplifier 1011. The D/A converter 1009 serves as an analog base band circuit for converting the digital base band signal s3 into an analog base band signal s4 that is input to the modulator 1010, which responds thereto for modulating a carrier of a predetermined frequency to provide a radio frequency transmission signal r1, of which power is amplified at the transmission power amplifier 1011 to provide a transmission signal r2, which is output for transmission from the transmission antenna 1012.

In the conventional CDMA base station transmitter, therefore, the CDMA system itself can cope with all channels by using a single carrier, without the need of a plurality of radio sections that are necessary for the TDMA or FDMA system, which means that the CDMA system works with a single analog base band/RF section at each base station (with a single transmission antenna when using sector antennae).

However, the multiplexed base band signal is a multi-level signal as a matter of course, so that a wide dynamic range and a high linearity are needed at the roll-off filter of the digital base band processing section as well as at the modulator and the transmission power amplifier of the analog base band/RF section.

Figure 2:
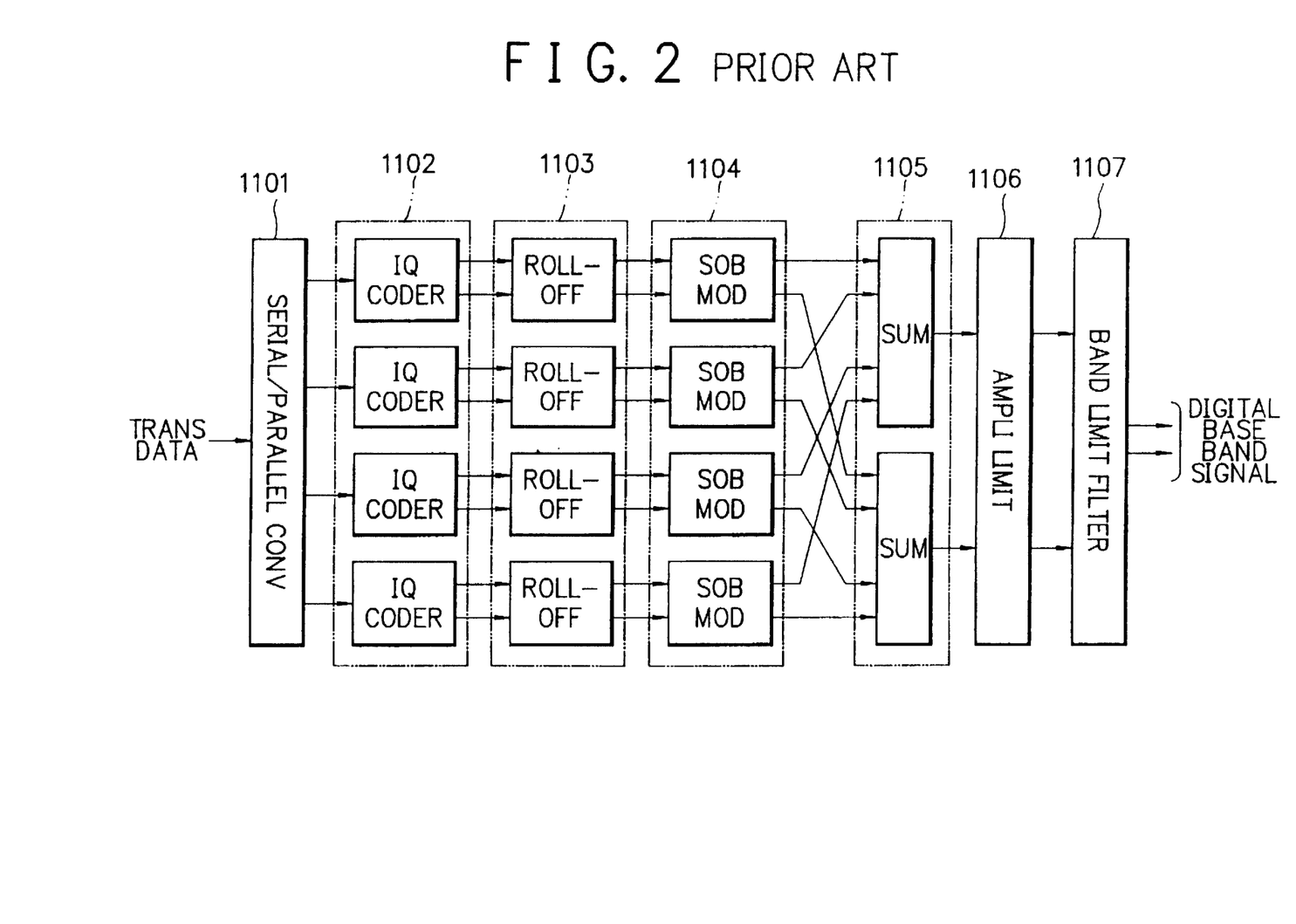
FIG. 2 is a block diagram of a conventional amplitude control transmitter for a multi carrier modulation.

Incidentally, there has been proposed in Japanese Patent Application Laid-Open Publication No. 6-116388 "an envelope control modulation device for multi carrier digital modulation" as a conventional communication system using a spectrum spread technique, in which a peak level of transmission power is suppressed. FIG. 2 shows an arrangement of the conventional system as an amplitude control transmitter for multi carrier modulation.

The amplitude control transmitter comprises a serial/parallel converter 1101 for a serial/parallel conversion of input transmission data, a four-channel IQ (I: in-phase component; Q: quadrature component) coder section 1102, a four-channel roll-off filter section 1103, a four-channel subcarrier modulator section 1104, a two-channel summer section 1105 corresponding to the IQ components, an amplitude limiter 1106 for limiting amplitudes of outputs of the summer section 1105, and a band limiting filter 1107 for limiting bands of outputs of the amplitude limiter 1106 to provide desirable digital base band signals.

The conventional envelope control modulation device for multi carrier digital modulation (as the amplitude control transmitter for multi carrier modulation) has peak power thereof reduced by provision of a combination of the amplitude limiter 1106 and the band limiting filter 1107 to a multi subcarrier modulation.

In this system, each subcarrier has a limited amplitude causing other subcarriers' spectral distortions, which are kept within an own occupied band, permitting the reduction of peak power and a limitation of leakage power from the occupied band to be both effected.

However, this conventional system is applicable merely when a plurality of subcarriers are used, and is ineffective if all channels are accommodated to a single carrier like the CDMA system. This is because transmission data, as their waveforms are once spectrum-shaped by the roll-off filters and amplitude-limited, again undergo band limitations so that they have their spectral distributions restored to original ones, as well as their temporal waveforms, thus resulting in lost effects on limitation of peak power.

It becomes more difficult for a base station transmitter of a mobile communication system to permit an increased scale of integration such as of an LSI, as the transmitter has increased numbers of analog circuits and radio frequency circuits, or to be adaptive for an advanced miniaturization or an improved cost effect, as the transmitter is subjected to a whole inpection for adjustment.

The CDMA system is a solution to overcome such problems, but employs a multiplexed spread signal of large amplitude variation, needing a very wide dynamic range and a high linearity to be both secured at an analog base band section, a modulator and a transmission power amplifier.

If a total of e.g. 100 channels are multiplexed, then the average power is a 100-fold of that of a single channel, with the possibility of having a 100-folded amplitude when the channels are summed up in phase, thus having as large peak power as a 100-fold (20 dB) of average power, needing a linearity to be kept over a range up to a level higher by 20 dB than the average power at respective circuit sections including the analog base band section, the modulator and the transmission power amplifier, which is problematic in particular at the transmission power amplifier, as it is for a base station for large power transmission. It should thus be necessary in this case for a transmission of 1 W/channel in average to provide a transmission power amplifier of a 10 kW output, which is impractical.

In the new North American standard system (IS95), the multiplicity per carrier stands between 10-tuple to 20-tuple, meeting conditions of the conventional system. It however is unavoidable for the above-described problems to be the more remarkable, as the multiplicity is increased for a better use of the CDMA system.

The present invention has been achieved with such points in mind.

SUMMARY OF THE INVENTION

It therefore is an object of the present invention to provide a code division multiple access (CDMA) base station transmitter which is free from the afore-mentioned problems of the prior art, permitting peak power of a transmission signal to be suppressed by addition of a simple circuit or of a small number of circuits using commercially available LSIs, without causing undesirable spectral distortions even in application to an increased multiplicity.

In accordance with one aspect of the present invention, there is provided a code division multiple access base station transmitter which is placed in a mobile communication system base station transmitting and receiving a plurality of communication channels by a direct spread code division multiple access system (DS-CDMA) and ensures suppression of transmission peak power while transmitting, comprising a plurality of spread units for spreading transmission data of a plurality of communication channels by different spreading codes to output spread signals; a summing synthesizer for summing up the spread signals output from the spread units to output a multiplexed spread signal; a limiter for performing an amplitude limitation of the multiplexed spread signal output from the summing synthesizer; a roll-off filter for carrying out a spectrum shaping of the amplitude-limited multiplexed spread signal so that an occupied band width of the amplitude-limited multiplexed spread signal is included within a predetermined value; a digital-to-analog converter for converting a digital base band signal of the spectrum-shaped multiplexed spread signal into an analog base band signal; a modulator for converting the analog base band signal into a radio frequency signal; a transmission power amplifier for amplifying the radio frequency signal output from the modulator; and a transmission antenna for transmitting the amplified radio frequency signal output from the transmission power amplifier.

In a preferable code division multiple access base station transmitter, the limiter includes a polar coordinate conversion circuit for converting I and Q components of the multiplexed spread signal to an amplitude component and a phase component of the multiplexed spread signal; a maximum value limitation circuit for limiting a maximum value of the amplitude component of the multiplexed spread signal to a level predetermined based on a characteristic of the transmission power amplifier and the allowable mutual interference between a plurality of communication channels; and an orthogonal coordinate conversion circuit for converting the maximum value limited amplitude component and the phase component of the multiplexed spread signal into I and Q components.

Preferably, the limiter is composed of a read only memory (ROM) which is addressed by the multiplexed spread signal to read data out of the read only memory to obtain an amplitude limited multiplexed spread signal.

Further, the limiter is preferably composed of two absolute value limitation circuits for limiting an I component as an in-phase component and a Q component as a quadrature component of the multiplexed spread signal to values predetermined based on a characteristic of the transmission power amplifier and the allowable mutual interference between a plurality of communication channels.

In a CDMA base station transmitter of the present invention, after an amplitude limitation is applied to a multiplexed spread signal obtained by summing up a plurality of channel spread spectrum signals, the amplitude limited multiplexed spread signal is input to a roll-off filter to output a digital base band signal. The amplitude limitation is applied to the multiplexed spread signal in consideration of the conditions which prevent a destruction of orthogonality between the channels by the amplitude limitation to cause an occurrence of an interference between the channels and prevent a damage of stability of use of a plurality of communication channels and on the basis of the characteristic of a transmission power amplifier, thereby predetermining the maximum limitation value.

After such an amplitude limitation, the multiplexed spread signal is passed through the roll-off filter to output a digital base band signal and the digital base band signal is input to an analog base band/RF section wherein a dynamic range and linearity required for an analog base band section, a modulator and a transmission power amplifier can be remarkably decreased. Furthermore, the amplitude limitation can be implemented by a simple circuit including LSIs available on the market.

BRIEF DESCRIPTION OF THE DRAWINGS

The objects, features and advantages of the present invention will become more apparent from the consideration of the following detailed description, taken in conjunction with the accompanying drawings, in which.

DESCRIPTION OF THE PREFERRED EMBODIMENTS

Figure 3:
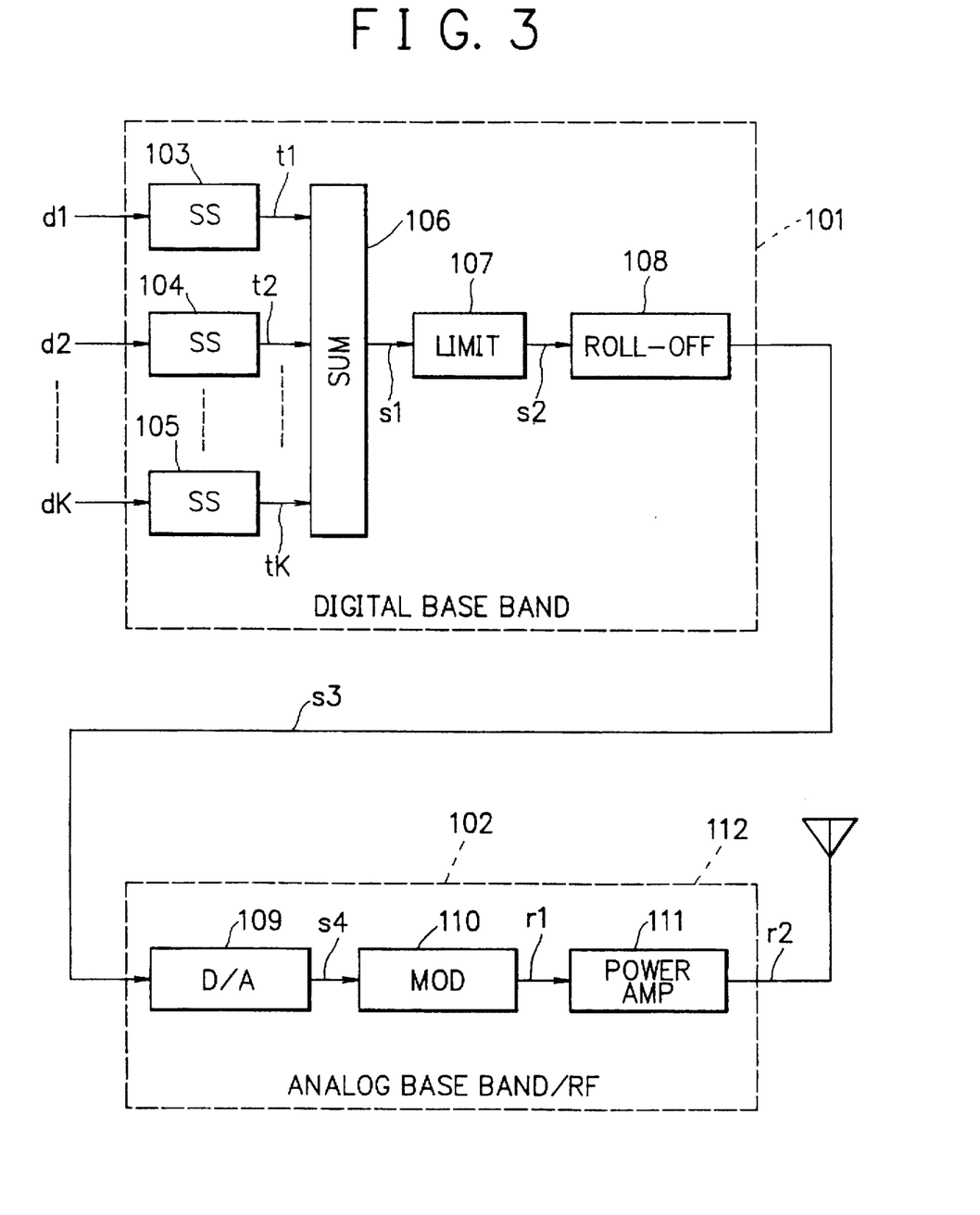
FIG. 3 is a block diagram of a CDMA base station transmitter according to a first embodiment of the present invention.

Referring now to the drawings, in FIG. 3, there is shown a code division multiple access (CDMA) base station transmitter according to one embodiment of the present invention.

This transmitter has a basic construction and comprises a digital base band processing section 101 which applies a spread spectrum to a plurality of channels of transmission data to synthesize a digital base band signal and applies a spectrum shaping to the digital base band signal to output a processed digital base band signal s3, an analog base band/ RF section 102 which converts the digital base band signal s3 fed from the digital base band processing section 101 into an analog base band signal s4 and produces an output transmission signal r2 based on a carrier modulation by the analog base band signal s4, and a transmission antenna 112 for transmitting the output transmission signal r2.

More specifically, the digital base band processing section 101 includes a plurality of spread units 103, 104, . . . , 105 of K channels for spreading a plurality of transmission data d1, d2 to dK by different spread codes to output spread signals t1, t2 to tK, a summer 106 for summing up the spread signals t1, t2 to tK fed from the spread units 103, 104 to 105 to output a multiplexed spread signal s1, a limiter 107 for limiting an amplitude of the multiplexed spread signal s1 to output an amplitude limited multiplexed spread signal s2, and a roll-off filter 108 for applying a spectrum shaping to the amplitude limit multiplexed spread signal s2 to output a digital base band signal s3.

The analog base band/RPF section 102 includes a digital-analog converter 109 for converting the digital base band signal s3 applied from the digital base band processing section 101 into an analog base band signal s4, a modulator 110 as an RF unit for modulating the carrier based on the analog base band signal s4 to output an RF (radio frequency) transmission signal r1, and a transmission power amplifier 111 for amplifying the RF transmission signal r1 to output an output transmission signal r2. The present invention is characterized by the limiter 107 added in the digital base band processing section 101.

Next, the operation of the above-described CDMA base station transmitter will now be described.

In this embodiment, the CDMA base station transmitter has the K communication channels. A plurality of channel-1 transmission data d1, channel-2 transmission data d2 to channel-k transmission data dK of K channels are input to the respective K spread units 103, 104 to 105 wherein the channel-1 transmission data d1, the channel-2 transmission data d2 to the channel-k transmission data dK are spread by the different spread codes in order to separate the channels from each other to output a channel-1 spread signal t1 a channel-2 spread signal t2 to a channel-K spread signal tK, respectively. These channel-1, channel-2 to channel-K spread signals t1, t2 to tK are summed up in the summer 106.

In the limiter 107, the multiplexed spread signal s1 output from the summer 106 is amplitude-limited so as to be equal to or lower than a predetermined value to output the amplitude limit multiplexed spread signal s2. The amplitude limit multiplexed spread signal s2 is passed through the roll-off filter 108 wherein the spectrum shaping is applied to the amplitude limit multiplexed spread signal s2 so that its occupied band width may be within a predetermined value.

The digital base band signal s3 output from the roll-off filter 108 is a digital base band signal of the transmission signal, and thus in the same manner as a usual digital modulator, the digital base band signal s3 is converted into the analog base band signal s4 by the digital-analog converter 109 in the analog base band/RF section 102.

The analog base band signal s4 is then converted into the RF transmission signal r1 based on the carrier modulation in the modulator 110 and the RF transmission signal r1 is amplified up to sufficient transmission power to cover its service area by the transmission power amplifier 111. The amplified output transmission signal r2 is then transmitted to the service area through the transmission antenna 112.

Next, when a binary phase modulation (BPSK) is employed, the spread units 103 to 105 and the limiter 107 will be described in detail in connection with FIGS. 4 and 5.

The channel-1 transmission data d1 to the channel-K transmission data dK have positive or negative values according to the contents of the transmission information. The transmission power of each channel is changed depending on a distance between the corresponding mobile station and the base station and a propagation condition and hence an absolute value of the channel-1, channel-2 or channel-K transmission data d1, d2 or dK is varied depending of the transmission power of each channel. The control of the transmission power itself is not directly related to the present invention and hence the description thereof can be omitted for brevity.

Figure 4:
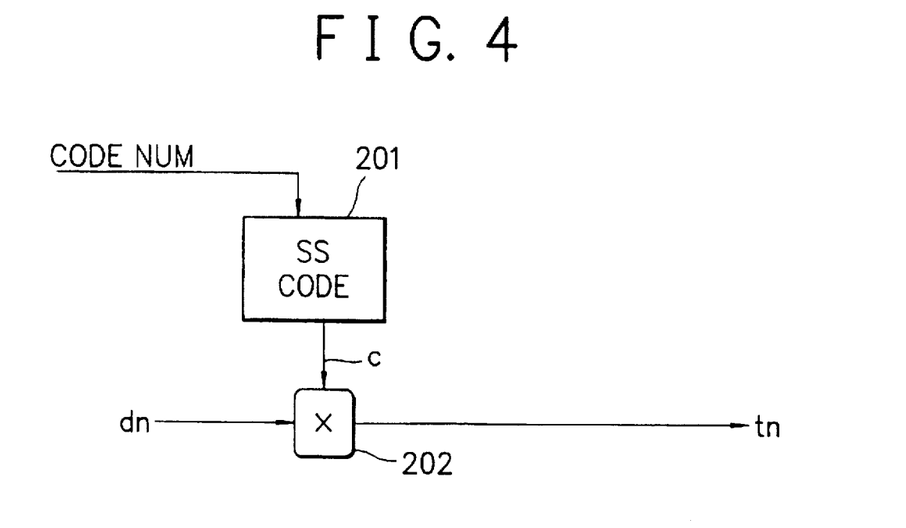
FIG. 4 is a block diagram of a first embodiment of a spread section shown in FIG. 3.

FIG. 4 shows a first embodiment of each spread unit 103, 104 or 105 in the BPSK shown in FIG. 3, including a spread code generator 201 and a code multiplier 202. The spread code is specified every channel by a code number of a different code. In order to remove an interference between channels, mutually orthogonal codes such as Walsh codes or orthogonal Gold codes (obtained by adding "0" to the Gold codes) are assigned to the channels. Now, assuming that a spread rate (a chip number per one symbol) is Ns, a code length of the above-described orthogonal code is Ns.

Further, in the case that the service area is covered by a plurality of base stations like a cellular system, the channels can be required to be distinguished between the adjacent base stations. In such a case, PN (pseudo noise) system codes having a far longer period than Ns, for example, M system codes having a period of $2^{41}-1$ as spread codes are used besides the orthogonal codes having the aforementioned Ns period. That is, a spread code c is defined by a code obtained by an EX-OR of an orthogonal code with the period Ns and an M system code with a long period.

The M system code is used for distinguishing among the base stations and the orthogonal code of the Ns period is among a plurality of channels in the same base station. In any case, the spread code c is a binary signal and is multiplied by +1 or −1 depending on its value, as follows:

$$tn = dn \ (c=0)$$

$$tn = -dn \ (c=1)$$

In these formulas, tn represents a channel spread signal, dn represents channel transmission data, and c represents a conversion code.

Further, the spread code c changes with the spread rate Ns times of the n channel transmission data dn and thus the spread signal tn also changes at the speed of Ns times. For example, when it is assumed that a symbol rate of the n channel transmission data dn is 16 kHz and the spread rate Ns=256, a chip rate of the spread signal tn is 4096 kHz (=16 kHz ×256).

Figure 5:
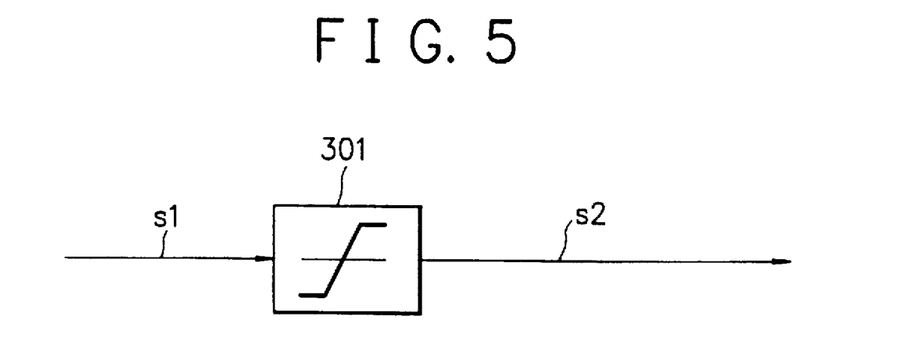
FIG. 5 is a block diagram of a first embodiment of a limiter shown in FIG. 3.

FIG. 5 illustrates a first embodiment of the limiter shown in FIG. 3 in the case of the BPSK.

In this case, the spread signal includes only the same phase component (one component) and the limiter can be composed of only a simple absolute value limit circuit. Assuming that the maximum value of a preset absolute value is Amax, an absolute value limit circuit 301 compares an input multiplexed spread signal s1 with Amax or −Amax to perform the following three processings, $$s2 = Amax \quad (s1 > Amax)$$
$$s2 = s1 \quad (-Amax \leq s1 \leq Amax)$$
$$s2 = -Amax \quad (s1 < -Amax)$$

and limits so that the amplitude of the multiplexed spread signal may be less than Amax, thereby obtaining an amplitude limit multiplexed spread signal s2.

The value Amax is mainly determined depending on the characteristic of the transmission power amplifier. When the value Amax is reduced, the peak power required for the transmission power amplifier can be lowered. However, the orthogonality between the channels is destroyed and hence an interference between the channels is caused.

The above-described amplitude limitation will be described with reference to a numeric example.

For simplicity, assuming that an amplitude of transmission data of all channels is one and a multiple number is 100, an average amplitude of a multiplexed spread signal is 10 and a peak amplitude is 100. Hence, in a conventional case using no limiter, a transmission amplifier with peak power/average power=100 is required. On the other hand, when Amax=50 is set by the limiter, a peak amplitude becomes 50 and it is sufficient to use a transmission amplifier with peak power/average power=25. That is, it is sufficient for the amplifier to transmit with a quarter of the peak power. This calculation does not includes an increment of the peak by the roll-off filter. However, there is no difference in the presence or absence of the limiter, and with a quarter of the peak power, the amplifier can be sufficiently used.

If a transmission power amplifier capable of transmitting only a quarter of the peak power is used without providing with a limiter, the transmission spectrum is distorted by a peak clip and leakage power to adjacent channels increases.

In this embodiment, the limiter functions before the roll-off filter and no distortion occurs in the transmission spectrum.

Although a waveform distortion is caused by the limiter, transmission quality degradation can be suppressed to a low level because the amplitude limitation probability is low and the CDMA system based on the spread spectrum is strong against the distortion and the interference and because in the CDMA system, usually, a low rate error correction code (for example, a convolutional code with a rate of ⅓ and a constraint length of 9) is used in combination and the influence of the waveform distortion due to the amplitude limitation is dispersed and thinned.

Although the above description is the example of the spread unit and the limiter in the case using the BPSK, the spread units 103 to 105, the limiter 107 and the roll-off filter 108 in the case using a quadrature phase modulation (QPSK) will now be described in connection with FIG. 6 to 11.

Figure 6:
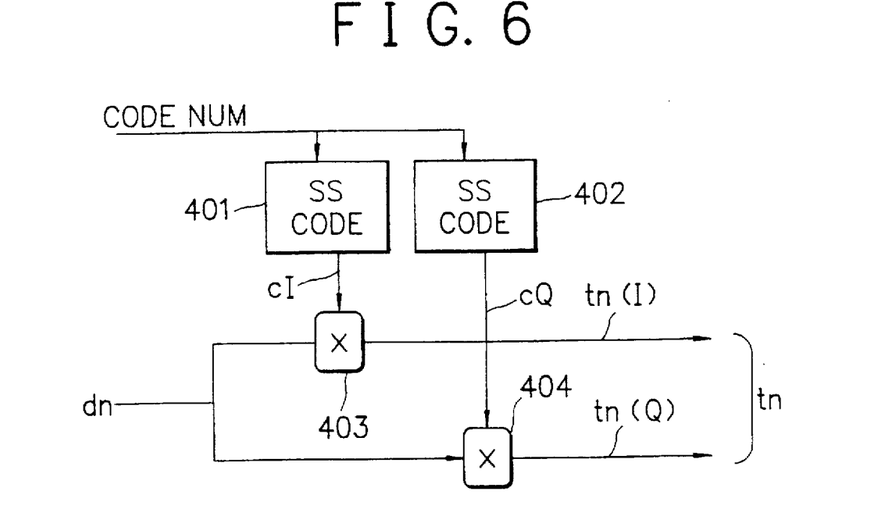
FIG. 6 is a block diagram of a second embodiment of the spread section shown in FIG. 3.

FIG. 6 shows a second embodiment of the spread unit shown in FIG. 3 in the case using the QPSK.

The spread unit comprises a first spread code generator 401 for outputting a spread code in-phase component cI in response to a code number, a second spread code generator 402 for outputting a spread code quadrature component cQ in response to the code number, a first code multiplier 403 for multiplying channel n transmission data by the spread code in-phase component cI to output a channel n spread signal in-phase component tn(I), and a second code multiplier 404 for multiplying the channel n transmission data by the spread code quadrature component cQ to output a channel n spread signal quadrature component tn(Q).

In the case shown in FIG. 6, the information of the transmission data is binary, and as spread codes of the in-phase component (I component) and the quadrature component (Q component), different spread codes are used. The spread signal is expressed by two signals of the in-phase component and the quadrature component.

Figure 7:
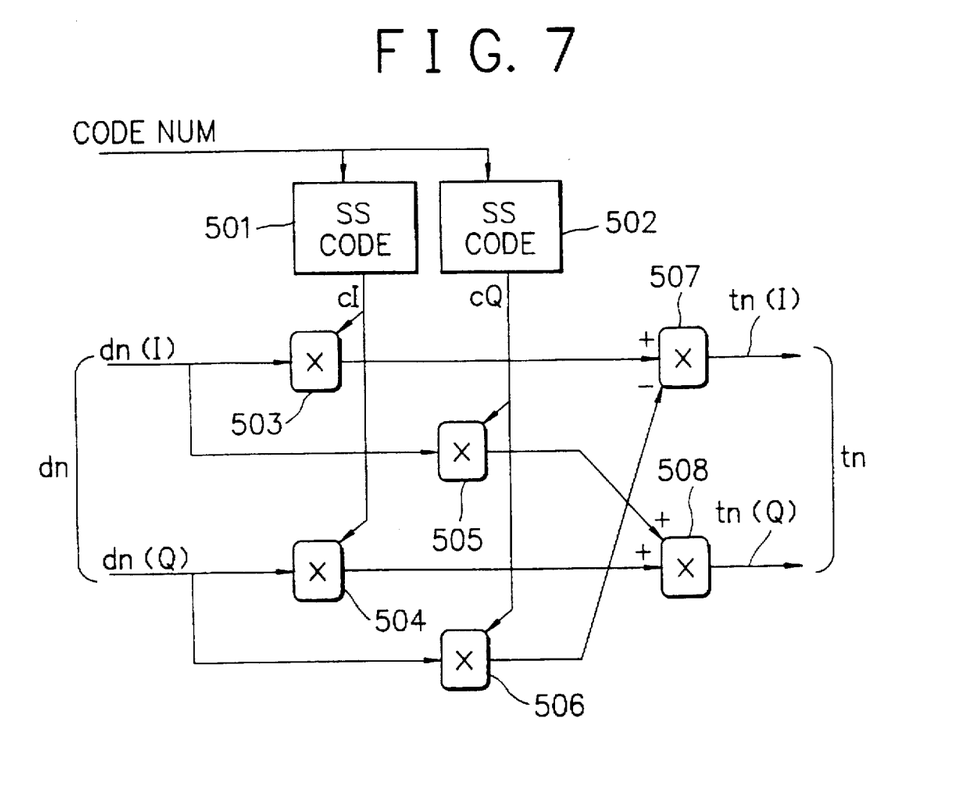
FIG. 7 is a block diagram of a third embodiment of the spread section shown in FIG. 3.

FIG. 7 shows a third embodiment of the spread unit shown in FIG. 3 in the case using the QPSK. The spread unit comprises a third spread code generator 501 for outputting a spread code in-phase component cI in response to a code number, a fourth spread code generator 502 for outputting a spread code quadrature component cQ in response to the code number, a third code multiplier 503 for multiplying channel n transmission data in-phase component dn(I) by the spread code in-phase component cI to output a channel n spread signal II component, and a fourth code multiplier 504 for multiplying the channel n transmission data quadrature component by the spread code quadrature component cQ to output a channel n spread signal QI component, a fifth code multiplier 505 for multiplying the channel n transmission data in-phase component dn(I) by the spread code quadrature component cQ to output a channel n spread signal IQ component, a sixth code multiplier 506 for multiplying the channel n transmission data quadrature component dn(Q) by the spread code quadrature component cQ to output a channel n spread signal QQ component, a first adder 507 for summing the outputs of the third code multiplier 503 and the sixth code multiplier 506 to output the channel n spread signal in-phase component tn(I), and a second adder 508 for summing the outputs of the fourth code multiplier 504 and the fifth code multiplier 505 to output the channel n spread signal quadrature component tn(Q).

In the case shown in FIG. 7, the information of the transmission data is a quadriphase of the channel n transmission in-phase component dn(I) and quadrature component dn(Q) and the spread code is also composed of the in-phase component and the quadrature component. By considering the in-phase and quadrature components of the transmission data and the spread code as a real part and an imaginary part of a complex signal, it can be said that the circuit shown in FIG. 7 performs a multiplication of complex numbers.

Figure 8:
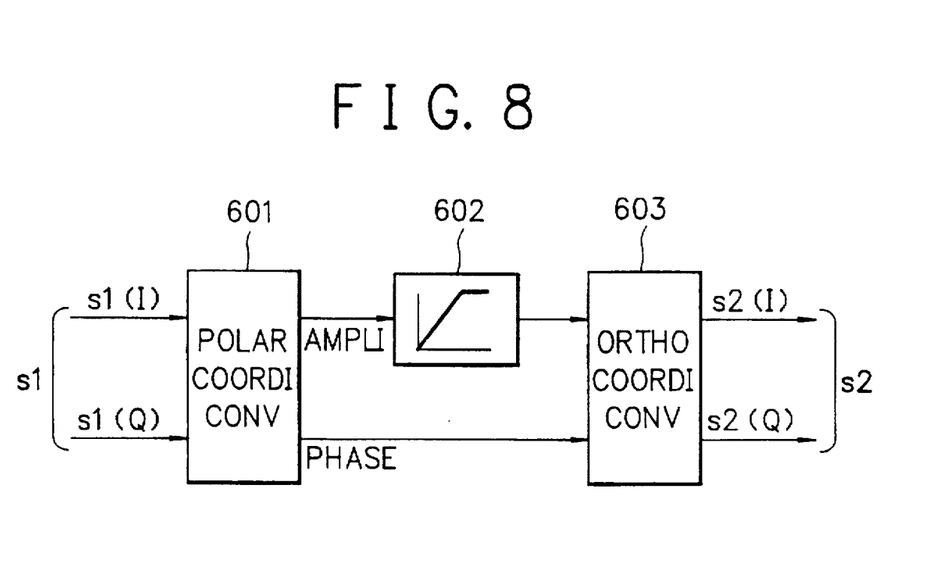
FIG. 8 is a block diagram of a second embodiment of the limiter shown in FIG. 3.

FIG. 8 illustrates a second embodiment of the limiter shown in FIG. 3 in the case using the QPSK.

The limiter comprises a polar coordinate conversion circuit 601, a maximum value limitation circuit 602 and an orthogonal coordinate conversion circuit 603. The polar coordinate conversion circuit 601 converts a multiplexed spread signal in-phase component s1(I) and a multiplexed spread signal quadrature component s1(Q) into an amplitude component and a phase component which are expressed by polar coordinates. The maximum value limitation circuit 602 limits so that the amplitude component may not exceed the predetermined value Amax. The orthogonal coordinate conversion circuit 603 converts the maximum value limited amplitude component and the phase component into orthogonal coordinates again to output an amplitude limit multiplexed spread signal in-phase component s2(I) and an amplitude limit multiplexed spread signal quadrature component s2(Q). An LSI for mutually converting between polar and orthogonal coordinates can be available.

Figure 9:
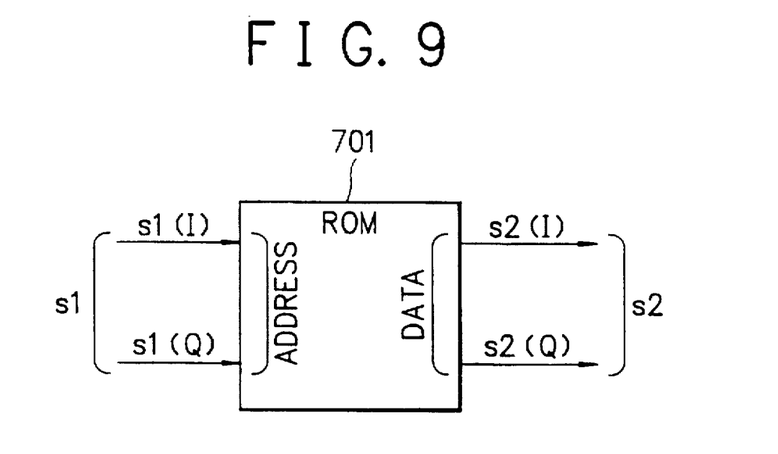
FIG. 9 is a block diagram of a third embodiment of the limiter shown in FIG. 3.

FIG. 9 illustrates a third embodiment of the limiter shown in FIG. 3.

In FIG. 9, the limiter is composed of a ROM 701 which is addressed by the multiplexed spread signal in-phase component s1(I) and the multiplexed spread signal quadrature component s1(Q) to read out the amplitude limit multiplexed spread signal in-phase component s2(I) and the amplitude limit multiplexed spread signal quadrature component s2(Q).

Now, when the multiplexed spread signal in-phase component s1(I) and the multiplexed spread signal quadrature component s1(Q) are expressed by 8 bits, respectively, the limiter can be implemented by one Mbits of ROM with an address number=$2^{16}$ and a data width=8 bits×2. Such a ROM means that the limiter of the QPSK can be realized by a simple circuit when a chip rate is less than a medium speed (for example, less than 10 MHz).

Figure 10:
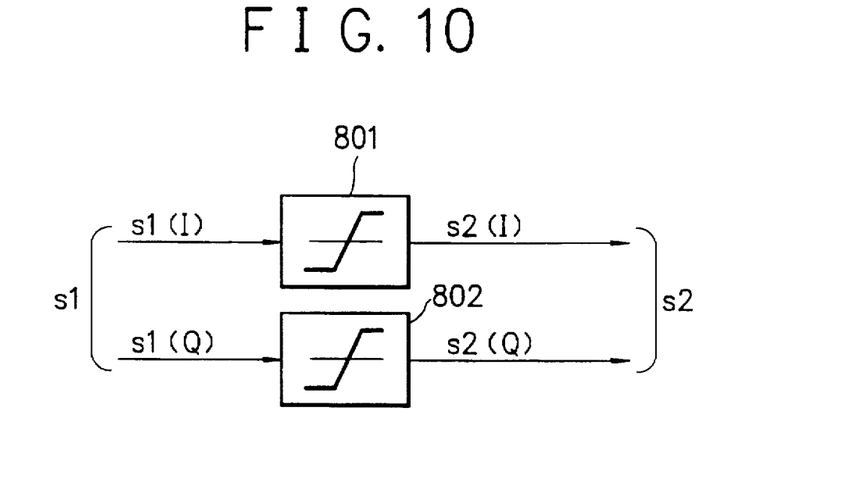
FIG. 10 is a block diagram of a fourth embodiment of the limiter shown in FIG. 3.

FIG. 10 shows a fourth embodiment of the limiter shown in FIG. 3.

In this embodiment, an absolute value limit circuit used in the first embodiment of the BPSK shown in FIG. 5 can apply to two absolute value limit circuits 801 and 802 for the in-phase and quadrature components of the input multiplexed spread signal. In this case, the limiter can be implemented by a very simple circuit.

Figure 11:
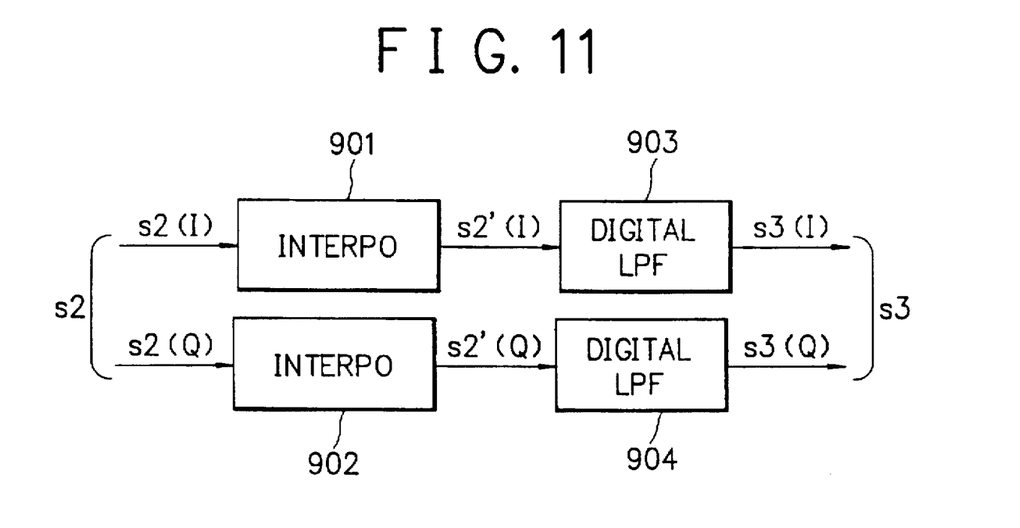
FIG. 11 is a block diagram of one embodiment of a roll-off filter shown in FIG. 3.

FIG. 11 shows one embodiment of the roll-off filter shown in FIG. 3.

In this embodiment, the roll-off filter comprises a pair of interpolation circuits 901 and 902 and a pair of digital low pass filters (LPFs) 903 and 904 for in-phase and quadrature components s2(I) and s2(Q) of an input amplitude limit multiplexed spread signal s2. The interpolation circuits 901 and 902 operate at a clock of M times (M is a positive integer of at least 2) of a chip rate and allow the input signal to pass one time per M clocks and zero to output the other M−1 times. That is, the interpolation circuits 901 and 902 output an oversampled pulse at a sampling rate of M times.

The digital LPFs are low pass filters for performing a spectrum shaping of the transmission signal, for example, root raised cosine filters of a roll-off factor 30%. The digital LPF is usually implemented by an FIR (finite impulse response) filter for realizing a linear phase characteristic.

When an interpolation is carried out by the interpolation circuits 901 and 902, by using M−1 zeros except one sample per input M samples of the digital filters, the interpolation circuits 901 and 902 and the digital LPFs are combined and a tap number is reduced to 1/M instead of which tap coefficients of M sets are switched per sample. An LSI having this construction is available at a market. By using this LSI on the market, the roll-off filter can be implemented.

Further, as M increases, aliasing due to a digital-analog (D/A) conversion can be removed the more readily. However, the clock of the digital LPFs 903 and 904 and D/A converters becomes faster and thus an optimum value must be determined depending on the chip rate. For example, in the case of a chip rate=4 MHz, assuming that M=8, the clock of the digital filters and the D/A converters becomes 32 MHz, and it can be considered that, even if the LSI on the market is used, the system can be readily implemented.

As described above, after conducting an amplitude limitation of a multiplexed spread signal, the signal is passed through the roll-off filter to check for an occurrence of a spectrum distortion to suppress a transmission peak voltage and to greatly improve the conditions such as a dynamic range and linearity of an analog base band section, a modulator and a transmission power amplifier of a CDMA base station transmitter having a simple construction.

In a CDMA base station transmitter of the present invention, as described above, after a multiplexed spread signal is amplitude-limited, the signal is input to a roll-off filter to obtain a digital band base signal and only a simple circuit or a circuit using some available LSIs on the market is supplemented to reduce a peak power to an average power ratio of the transmission signal without causing any spectrum distortion and to remarkably improve the desired dynamic range and the linearity of an analog base band section, a modulator and a transmission power amplifier, particularly, to reduce a peak value so that an excessive linearity of the transmission power amplifier may not be required. Hence, remarkable efficiency increase of the transmission power amplifier and a low cost can be attained.

While the present invention has been described in its preferred embodiments with reference to the accompanying drawings, it will be appreciated that various changes and modifications can be made by those skilled in the art without departing from the spirit and scope of the present invention.

What is claimed is:

1. A code division multiple access base station transmitter which is placed in a mobile communication system base station transmitting and receiving a plurality of communication channels by a direct spread code division multiple access system and ensures suppression of transmission peak power while transmitting, comprising:

a plurality of spread units for spreading transmission data of a plurality of communication channels by different spreading codes to output spread signals;

a summing synthesizer for summing up the spread signals output from the spread units to output a multiplexed spread signal;

a limiter for performing an amplitude limitation of the multiplexed spread signal output from the summing synthesizer, the limiter including a polar coordinate conversion circuit converting an amplitude component and a phase component of the multiplexed spread signal, a maximum value limitation circuit limiting a maximum value of the amplitude component of the multiplexed spread signal to a predetermined level based on a characteristic of the transmission power amplifier and the allowable mutual interference of the plurality of communication channels, and an orthogonal coordinate conversion circuit converting the maximum value limited amplitude component and the phase component of the multiplexed spread signal into orthogonal coordinates;

a roll-off filter for carrying out a spectrum shaping of the amplitude-limited multiplexed spread signal so that an occupied band width of the amplitude-limited multiplexed spread signal is included within a predetermined value;

a digital-to-analog converter for converting a digital base band signal of the spectrum-shaped multiplexed spread signal into an analog base band signal;

a modulator for converting the analog base band signal into a radio frequency signal;

a transmission power amplifier for amplifying the radio frequency signal output from the modulator; and a transmission antenna for transmitting the amplified radio frequency signal output from the transmission power amplifier.

2. A code division multiple access base station transmitter which is placed in a mobile communication system base station transmitting and receiving a plurality of communication channels by a direct spread code division multiple access system and which ensures suppression of transmission peak power while transmitting, comprising:

a plurality of spread units spreading transmission data of a plurality of communication channels by different spreading codes to output spread signals;

a summing synthesizer summing up the spread signals output from the spread units to output a multiplexed spread signal;

a limiter performing an amplitude limitation of the multiplexed spread signal output from the summing synthesizer, the limiter comprising a read only memory which is addressed by the multiplexed spread signal to read data out of the read only memory to obtain an amplitude limited multiplexed spread signals;

a roll-off filter carrying out a spectrum shaping of the amplitude-limited multiplexed spread signal so that an occupied band width of the amplitude-limited multiplexed spread signal is included within a predetermined value:

a digital-to-analog converter converting a digital base band signal of the spectrum-shaped multiplexed spread signal into an analog base band signal;

a modulator converting the analog base band signal into a radio frequency signal;

a transmission power amplifier amplifying the radio frequency signal output from the modulator; and a transmission antenna transmitting the amplified radio frequency signal output from the transmission power amplifier.

3. A code division multiple access base station transmitter which is placed in a mobile communication system base station transmitting and receiving a plurality of communication channels by a direct spread code division multiple access system and which ensures suppression of transmission peak power while transmitting, comprising:

a Plurality of spread units spreading transmission data of a plurality of communication channels by different spreading codes to output spread signals;

a summing synthesizer summing up the spread signals output from the spread units to output a multiplexed spread signal;

a limiter performing an amplitude limitation of the multiplexed spread signal output from the summing synthesizer, the limiter comprising two absolute value limitation circuits for limiting an in-phase component and a quadrature component of the multiplexed spread signal to predetermined values based on a characteristic of the transmission power amplifier and the allowable mutual interference of the plurality of communication channels;

a roll-off filter carrying out a spectrum shaping of the amplitude-limited multiplexed spread signal so that an occupied band width of the amplitude-limited multiplexed spread signal is included within a predetermined value;

a digital-to-analog converter converting a digital base band signal of the spectrum-shaped multiplexed spread signal into an analog base band signal;

a modulator converting the analog base band signal into a radio frequency signal;

a transmission power amplifier amplifying the radio frequency signal output from the modulator; and a transmission antenna transmitting the amplified radio frequency signal output from the transmission power amplifier.

* * * * *